(12) United States Patent
Tanaka et al.

(10) Patent No.: US 7,841,639 B2
(45) Date of Patent: Nov. 30, 2010

(54) UTILITY VEHICLE EQUIPPED WITH EXTENDABLE CARGO BED

(75) Inventors: Shunji Tanaka, Kobe (JP); Fumio Ichihara, Kako-gun (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 218 days.

(21) Appl. No.: 12/082,373

(22) Filed: Apr. 9, 2008

(65) Prior Publication Data
US 2009/0256388 A1   Oct. 15, 2009

(51) Int. Cl.
*B62D 25/00* (2006.01)
(52) U.S. Cl. .................. 296/65.05; 296/183.2
(58) Field of Classification Search ............. 296/183.1, 296/65.01, 186.4, 63, 66, 65.09, 183.2
See application file for complete search history.

(56) References Cited

U.S. PATENT DOCUMENTS

| | | | |
|---|---|---|---|
| 6,182,771 B1 * | 2/2001 | Nakamura et al. | 172/431 |
| 6,478,355 B1 * | 11/2002 | Van Eden et al. | 296/37.6 |
| 6,905,159 B1 | 6/2005 | Saito et al. | |
| 7,578,544 B1 * | 8/2009 | Shimamura et al. | 296/183.2 |

\* cited by examiner

*Primary Examiner*—Glenn Dayoan
*Assistant Examiner*—Melissa A Black
(74) *Attorney, Agent, or Firm*—Alleman Hall McCoy Russell & Tuttle LLP

(57) ABSTRACT

A utility vehicle comprises plural rows of seats mounted in a vehicle body of the utility vehicle, and an extendable cargo bed positioned behind the seats. The cargo bed includes a bottom wall member having an extended region which is extended forward relative to a cargo accommodating space in an unextended state of the cargo bed. The plural rows of seats include a rear seat having a rear seat seating portion which is rotatably provided on the extended region of the bottom wall member such that the rear seat seating portion is rotatable forward to an upright position. The rear seat seating portion has a bottom plate provided integrally with a bottom surface thereof. In a state where the rear seat seating portion is rotated forward and is in the upright position, the bottom plate of the rear seat seating portion defines a front wall member of the cargo bed.

4 Claims, 14 Drawing Sheets

UTILITY VEHICLE EQUIPPED WITH EXTENDABLE CARGO BED

BACKGROUND ART

A pick-up style utility vehicle typically includes a metal-made vehicle body, four wheels consisting of front wheels and rear wheels, an engine which is a driving source configured to generate a driving power, plural rows of seats on which passengers are seated, a cabin frame surrounding the seats from front and rear and from right and left, a cargo bed provided behind the seats, etc. In such a utility vehicle, it is desired that the cargo bed be required to have a large volume. However, the volume of the cargo bed is limited because the plural rows of seats occupy a space in a center section of the vehicle body. Accordingly, U.S. Pat. No. 6,905,159 discloses a utility vehicle in which two rows of seats are arranged and a rear seat is capable of being folded down forward so that a cargo bed is extendable in the resulting empty space.

In order to extend the cargo bed in this utility vehicle, it is necessary to remove a screen shield serving as a front wall member of the cargo bed before extending the cargo bed, to re-position the screen shield in a location corresponding to a front wall member of the extended cargo bed and to fasten the screen shield to the cargo bed by bolts and other members. The screen shield extends upward to spatially separate the cargo bed from a rear seat. An operation for removing and attaching the screen shield requires much labor and time. In view of the circumstances, there is a demand for a more simplified extension system for the cargo bed.

SUMMARY OF THE INVENTION

A utility vehicle comprises plural rows of seats mounted in a vehicle body of the utility vehicle; and an extendable cargo bed positioned behind the plural rows of seats; wherein the cargo bed includes a bottom wall member having an extended region which is extended forward relative to a cargo accommodating space in an unextended state of the cargo bed; wherein the plural rows of seats include a rear seat having a rear seat seating portion, which is rotatably provided on the extended region of the bottom wall member such that the rear seat seating portion is rotatable forward to an upright position; wherein the rear seat seating portion has a bottom plate provided integrally with a bottom surface thereof; and wherein, in a state where the rear seat seating portion is rotated forward and is in the upright position, the bottom plate of the rear seat seating portion defines a front wall member of the cargo bed.

In accordance with such a configuration, by rotating the rear seat seating portion forward to the upright position, the bottom plate of the rear seat seating portion is directed backward and defines the front wall member of the cargo bed. This makes it possible to omit the operation for removing and attaching the front wall member of the cargo bed. As a result, a user is able to easily accomplish extension of the cargo bed.

DETAILED DESCRIPTION OF THE PREFERRED EMBODIMENTS

Hereinafter, a utility vehicle according to embodiments will be described with reference to the accompanying drawings. In the embodiments described below, the directions are referenced from the perspective of a driver (not shown) getting in the utility vehicle except for cases specified.

Figure 1:
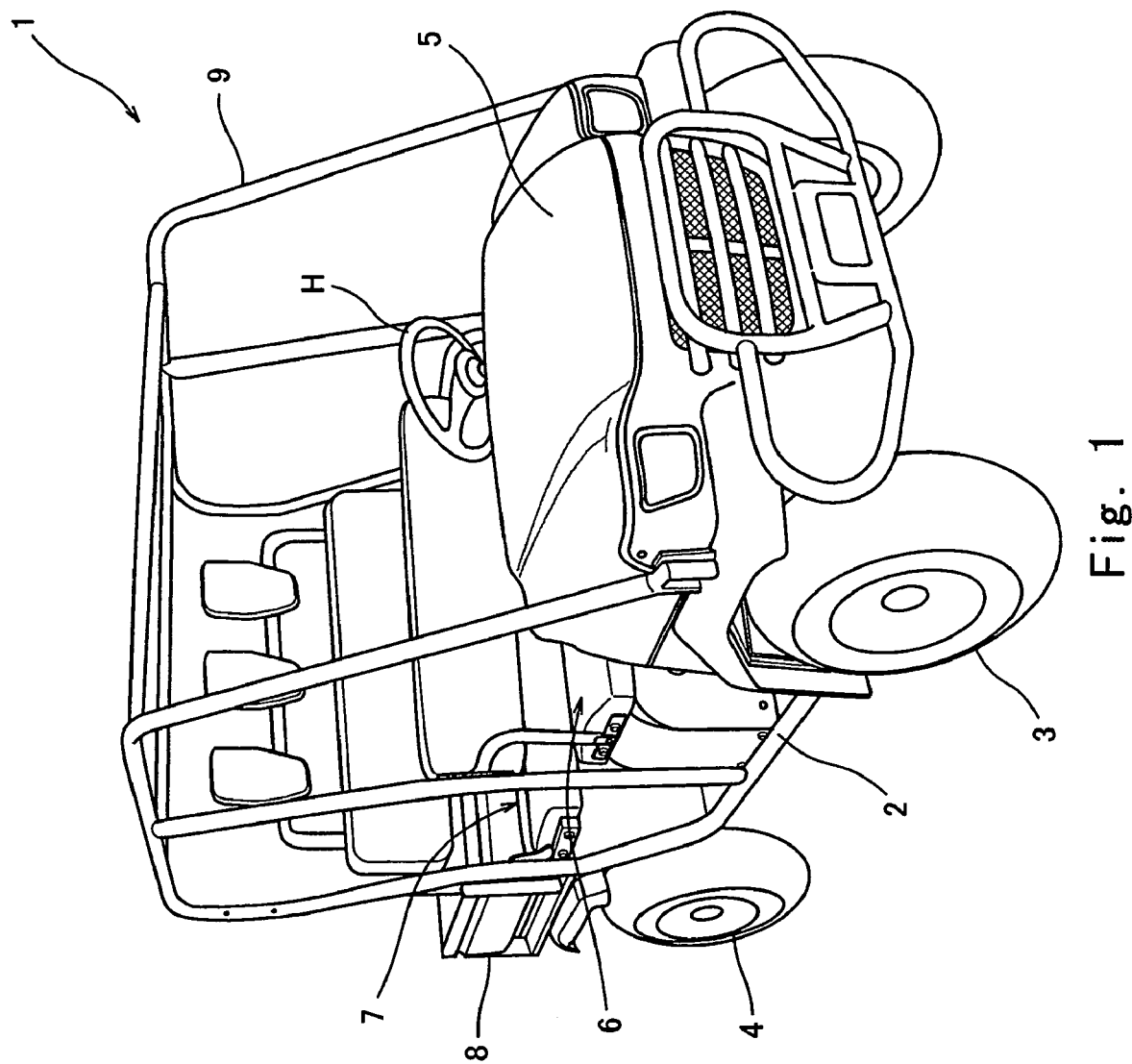
FIG. 1 is a perspective view of a utility vehicle according to a first embodiment as viewed from front.

FIG. 1 is a perspective view of a utility vehicle 1 according to a first embodiment as viewed from front. As shown in FIG. 1, the utility vehicle 1 comprises a pair of front wheels 3 at right and left sides of a front part of a vehicle body 2 and a pair of rear wheels 4 at right and left sides of a rear part of the vehicle body 2. A hood 5 is mounted over the front wheels 3. Two bench-type seats, i.e., front and rear seats 6 and 7, are provided behind the hood 5, and are positioned in the vicinity of a center section in a longitudinal direction of the vehicle body 2. The front seat 6 includes a region where the driver is seated. A steering handle H is disposed in front of the region where the driver is seated. A cargo bed 8 is mounted behind the rear seat 7.

The cargo bed 8 extends rearward from a location near the rear seat 7 over the rear wheels 4. A cabin frame 9 extends from both sides of a front portion of the hood 5 to a region behind the rear seat 7. The cabin frame 9 surrounds a passenger space in which the seats 6 and 7 are disposed. The cabin frame 9 is open forward and backward, rightward and leftward, and upward. The cabin frame 9 serves to protect the passengers and is used as a mounting member by which a roof or a hood for blocking rain or sunshine is mounted. It should be noted that an upper limit of a travel speed is set lower in the utility vehicle 1 and doors and front glasses are omitted so that the passengers can easily get in and out of the utility vehicle 1.

Figure 2:
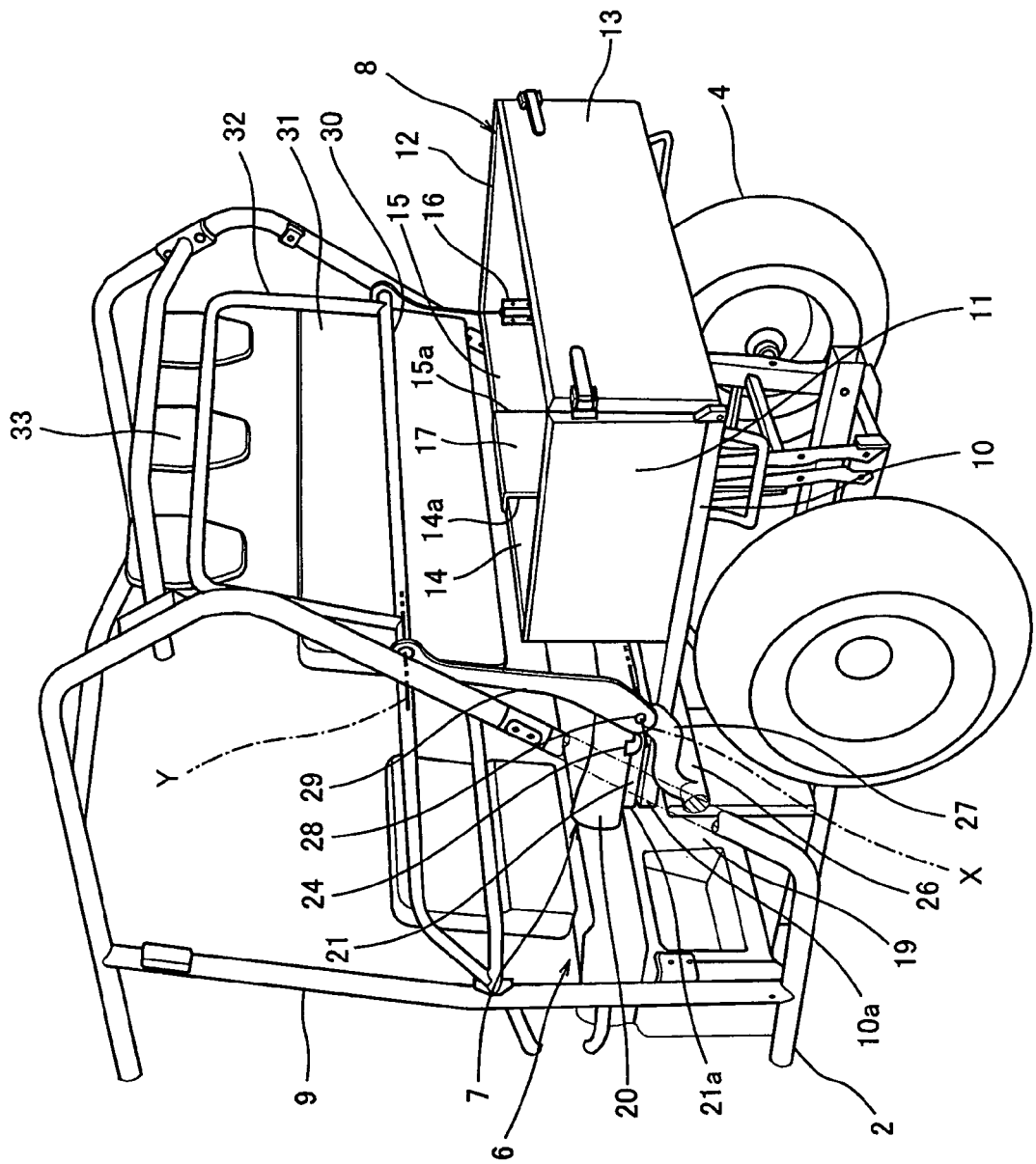
FIG. 2 is a perspective view of the utility vehicle of FIG. 1 as viewed from rear.

FIG. 2 is a perspective view of the utility vehicle 1 of FIG. 1 as viewed from rear. FIG. 2 shows a state where the rear seat 7 is in use and the cargo bed 8 is unextended. The cargo bed 8 has a bottom wall member 10 formed of a metal plate and a pair of a left side wall member 11 and a right side wall member 12 which are formed of metal plates and extend vertically from the bottom wall member 10. The bottom wall member 10 extends forward from under a cargo accommodating space in the unextended state. The side wall members 11 and 12 are provided in a rear region of the bottom wall member 10 and are adjacent the cargo accommodating space in the unextended state.

An openable wall member 13, which is formed of a metal plate, is attached to a rear end portion of the bottom wall member 10. The openable wall member 13 closes an opening formed between rear end portions of the left side wall member 11 and the right side wall member 12. The openable wall member 13 is rotatable at a lower end thereof around an axis extending in a lateral direction (width direction perpendicular to a direction in which the utility vehicle 1 travels) of the vehicle body 2. A pair of a left gate-shaped wall member 14 and a right gate-shaped wall member 15, which are formed of metal plates, are rotatably coupled by hinges 16 to a front end portion of the left side wall member 11 and a front end portion of the right side wall member 12, respectively. The gate-shaped wall members 14 and 15 are coupled to the side wall members 11 and 12 so as to be rotatable around axes vertically extending in locations near the front end portions of the side wall members 11 and 12, respectively. In the unextended state of the cargo bed 8, the gate-shaped wall members 14 and 15 extend in a direction perpendicular to the side wall members 11 and 12 such that they are oriented closer to each other, whereas in the extended state of the cargo bed 8, the gate-shaped wall members 14 and 15 extend in the same direction as the direction in which the side wall members 11 and 12 extend so as to be substantially coplanar with the side wall members 11 and 12. In other words, the gate-shaped wall members 14 and 15 serve as a pair of left and right extendable wall members which are respectively protrusible forward from the front end portions of the side wall members 11 and 12. The gate-shaped wall members 14 and 15 are substantially equal in height to the side wall members 11 and 12.

In the unextended state of the cargo bed 8, the gate-shaped wall members 14 and 15 are rotated in the direction closer to each other and define a front wall member of the cargo bed 8. In this state, because of a dimensional limitation, there is a gap formed between tip end portions 14a and 15b of the gate-shaped wall members 14 and 15 which are located closer to each other. When a lateral length of each of the gate-shaped wall members 14 and 15 defining the front wall member of the cargo bed 8 is A, a lateral width of the bottom wall member 10 is B, and the gap is C, a relationship indicating 2A<B and C=B−2A is established. To close the gap, a closing wall member 17 is removably attached to the gate-shaped wall members 14 and 15. As described later, with reference FIG. 4, the closing wall member 17 is formed of a resin or metal plate and sliding grooves 17a and 17b are formed in a concave shape at right and left end portions of the closing wall member 17 so as to extend vertically. The sliding grooves 17a and 17b are vertically slidably fitted to the tip end portions 14a and 15b of the gate-shaped wall members 14 and 15. A fitting groove 17c is formed in a concave shape on a front surface of the closing wall member 17 so as to extend in the lateral direction. By the fitting groove 17c, the closing wall member 17 is temporarily attached to the rear seat 7. Fastening mechanisms 35 (see FIG. 9) are respectively attached to the gate-shaped wall members 14 and 15 to couple left and right end portions of a bottom plate 21, to be described later, to the tip end portions 14a and 15a defining the front end portions of the gate-shaped wall members 14 and 15.

On an extended region (forward region) of the bottom wall member 10 of the cargo bed 8, a rear seat seating portion 20 of the rear seat 7 is disposed. The bottom plate 21 is formed of a metal plate extending in the lateral direction and is fastened to a bottom surface of the rear seat seating portion 20. The width, i.e., lateral length of the bottom plate 21, is substantially equal to a distance between the left side wall member 11 and the right side wall member 12. In other words, the bottom plate 21 extends from one end to an opposite end in the lateral direction of the cargo accommodating space. The longitudinal length of the bottom plate 21 is substantially equal to the height of the side wall members 11 and 12 and the gate-shaped wall members 14 and 15. In other words, the height of the bottom plate 21, in a state where the rear seat seating portion 20 is rotated forward and is in an upright position, is substantially equal to the height of the left side wall member 11, the right side wall member 12, the left gate-shaped wall member 14, and the right gate-shaped wall member 15.

An arm support pipe 26 is mounted under the extended region (forward region) of the bottom wall member 10 of the cargo bed 8. The arm support pipe 26 forms a part of the vehicle body 2 and extends in the lateral direction. Brackets 27 are fastened to right and left portions of the arm support pipe 26, respectively so as to extend rearward. Pivot arms 29 are each mounted at one end portion thereof to a rear end portion of each bracket 27 via a pivot 28 having a pivot axis X extending in the lateral direction. Each pivot arm 29 extends in a direction substantially perpendicular to the pivot 28 and is angularly displaceable around the pivot 28. To be more specific, an opposite end portion of each pivot arm 29 is movable around the pivot 28 so as to draw a circular-arc shaped track. In the unextended state of the cargo bed 8, the pivot arms 29 are positioned behind the rear seat seating portion 20 so as not to interfere with the passengers who are going to get into and out of the rear seat 7.

A backrest support pipe 30 extends in the lateral direction and is supported at right and left end portions thereof by the opposite end portions of the pivot arms 29. A plate-shaped rear seat backrest 31 is integrally fastened to the backrest support pipe 30. The backrest support pipe 30 is angularly displaceable with respect to the pivot arms 29 around an angular displacement axis Y extending in the lateral direction so that the rear seat backrest 31 is angularly displaceable with respect to the pivot arms 29. The rear seat backrest 31 is positioned with a gap above a rear end portion of the rear seat seating portion 20. The gap allows the rear seat backrest 31 to be moved forward over the rear seat seating portion 20 to a forward location relative to the rear seat seating portion 20 when extending the cargo bed 8. In the unextended state of the cargo bed 8, the gate-shaped wall members 14 and 15 are positioned behind the gap to close the gap.

Figure 6:
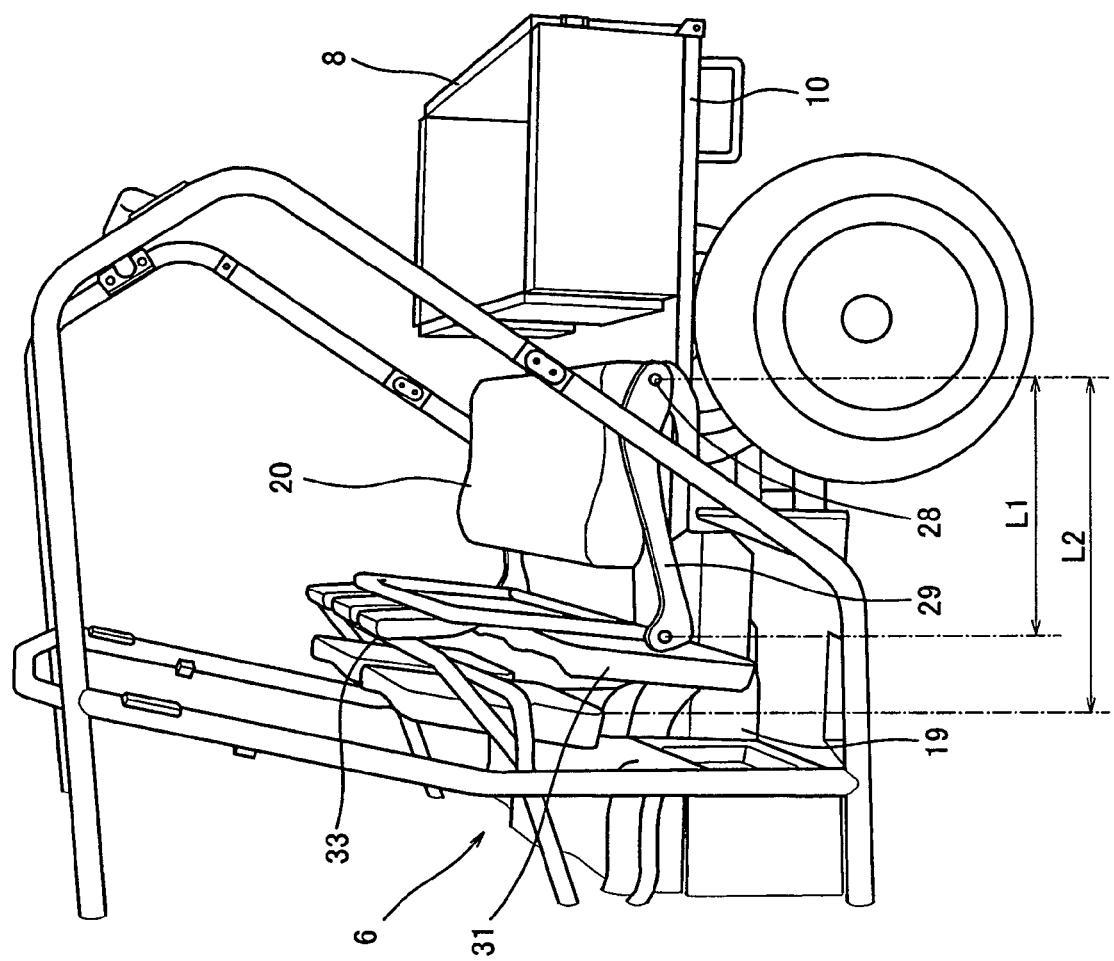
FIG. 6 is a perspective view showing a state where the rear seat backrest is stowed in the utility vehicle of FIG. 5, as viewed from left.

A head rest support pipe 32 protrudes upward from the backrest support pipe 30. Three head rests 33 are fastened to the head rest support pipe 32. As shown in FIG. 6, the pivot arm 29 is formed so that a distance L1 between the pivot axis X and the angular displacement axis Y is smaller than a distance L2 between the pivot axis X and a backrest of the front seat 6. This makes it possible for the pivot arms 29 to avoid contact with the front seat 6 in the extended state of the cargo bed 8. In addition, since the pivot axis X is positioned in the vicinity of a rear end of the rear seat seating portion 20, the pivot arms 29 can be made to have a sufficient length while avoiding interference with other members and components, and the rear seat backrest 31 can be positioned higher, as compared to a case where the pivot axis X is positioned in front of the rear seat seating portion 20.

Figure 3:
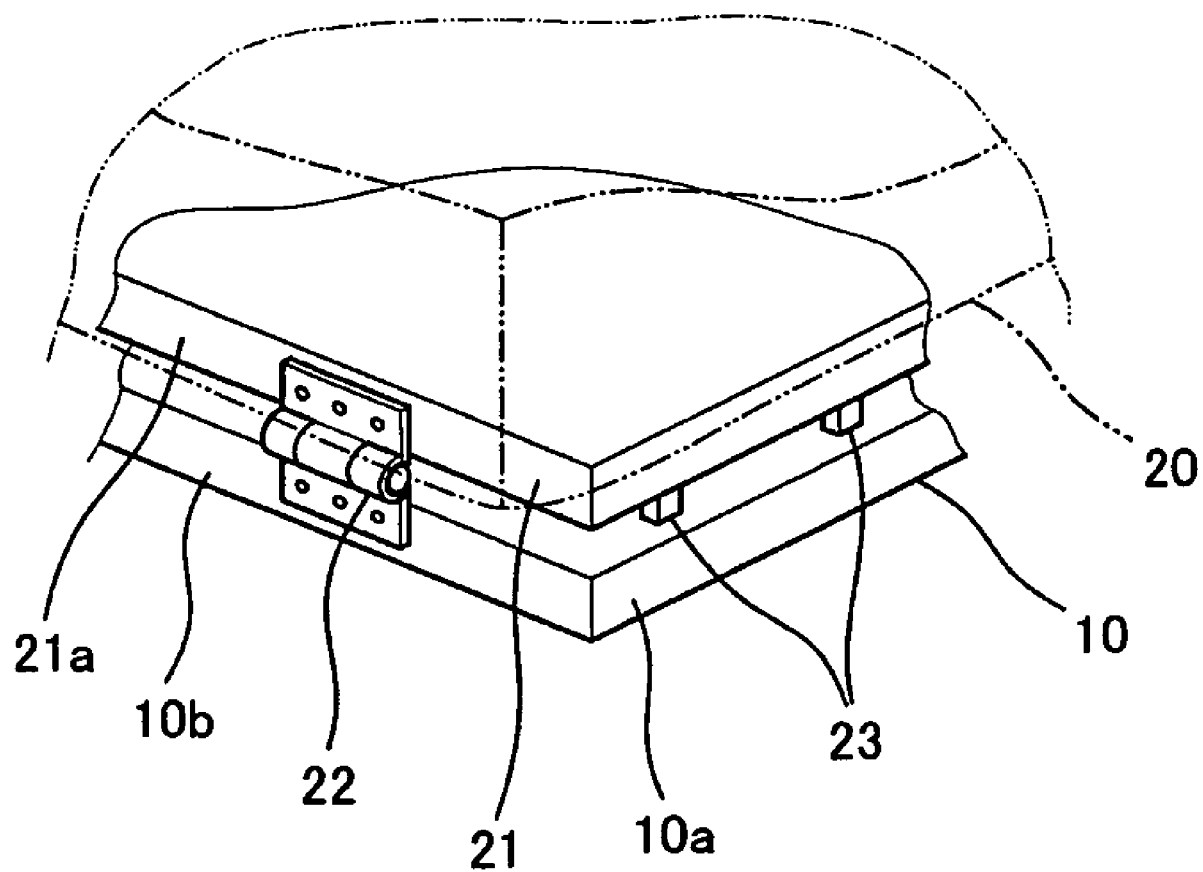
FIG. 3 is a perspective view showing a rotating mechanism for a rear seat of the utility vehicle of FIG. 1.
Figure 7:
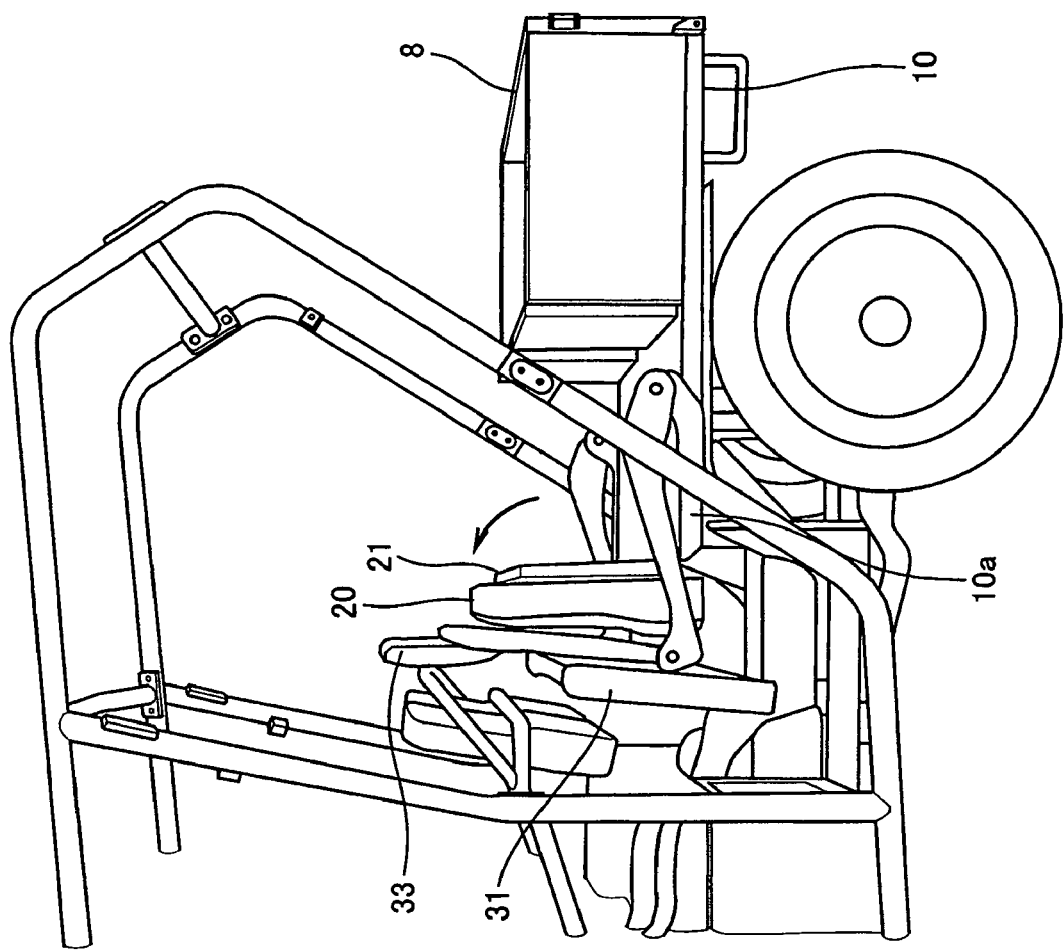
FIG. 7 is a perspective view showing a state where a rear seat seating portion is rotated forward to an upright position in the utility vehicle of FIG. 6, as viewed from left.

FIG. 3 is a perspective view showing a rotating mechanism of the rear seat 7 of the utility vehicle 1 shown in FIG. 1. As shown in FIG. 3, a front end portion 21a of the bottom plate 21 fastened to the rear seat seating portion 20 is coupled by a hinge 22 to a front end portion 10b of the bottom wall member 10 of the cargo bed 8. To be more specific, the bottom plate 21 is rotatably coupled to the bottom wall member 10 of the cargo bed 8 forming a part of the vehicle body 2 and is rotatable forward to the upright position, as shown in FIG. 7. A plurality of vibration-proof rubber members 23, which are elastic members, are attached to desired locations of the bottom plate 21 of the rear seat seating portion 20 so as to contact the bottom wall member 10 of the cargo bed 8. In other words, the bottom plate 21 is supported on the bottom wall member 10 with the rubber members 23 provided therebetween. Hook-shaped engaged members 24 (see FIG. 9) forming the fastening mechanism 35, to be described later, are attached to right and left end portions of the bottom plate 21 of the rear seat seating portion 20.

Figure 4:
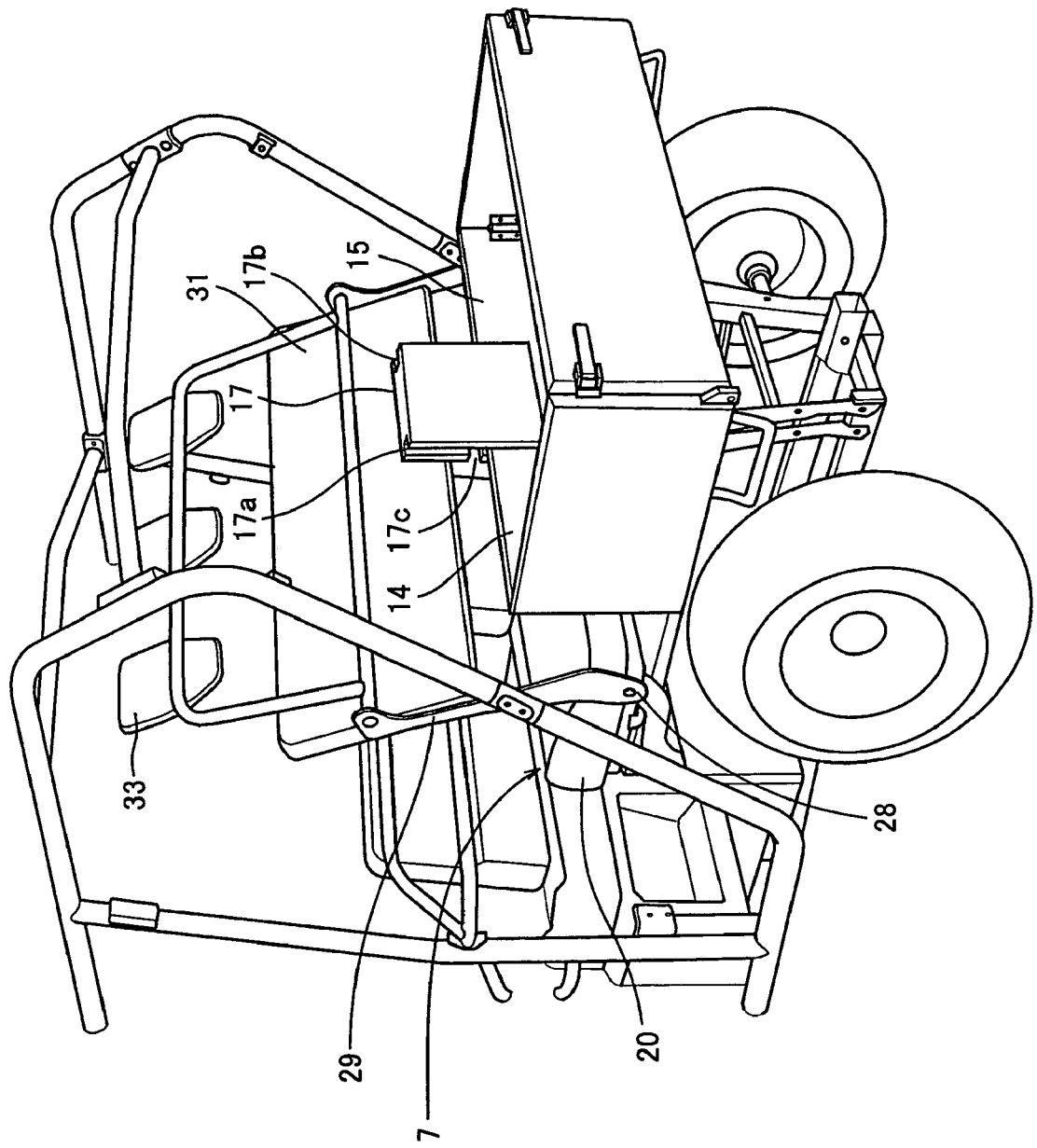
FIG. 4 is a perspective view showing a state where a rear seat backrest starts to be moved and a closing wall member starts to be removed from a cargo bed in the utility vehicle of FIG. 2, as viewed from rear.
Figure 5:
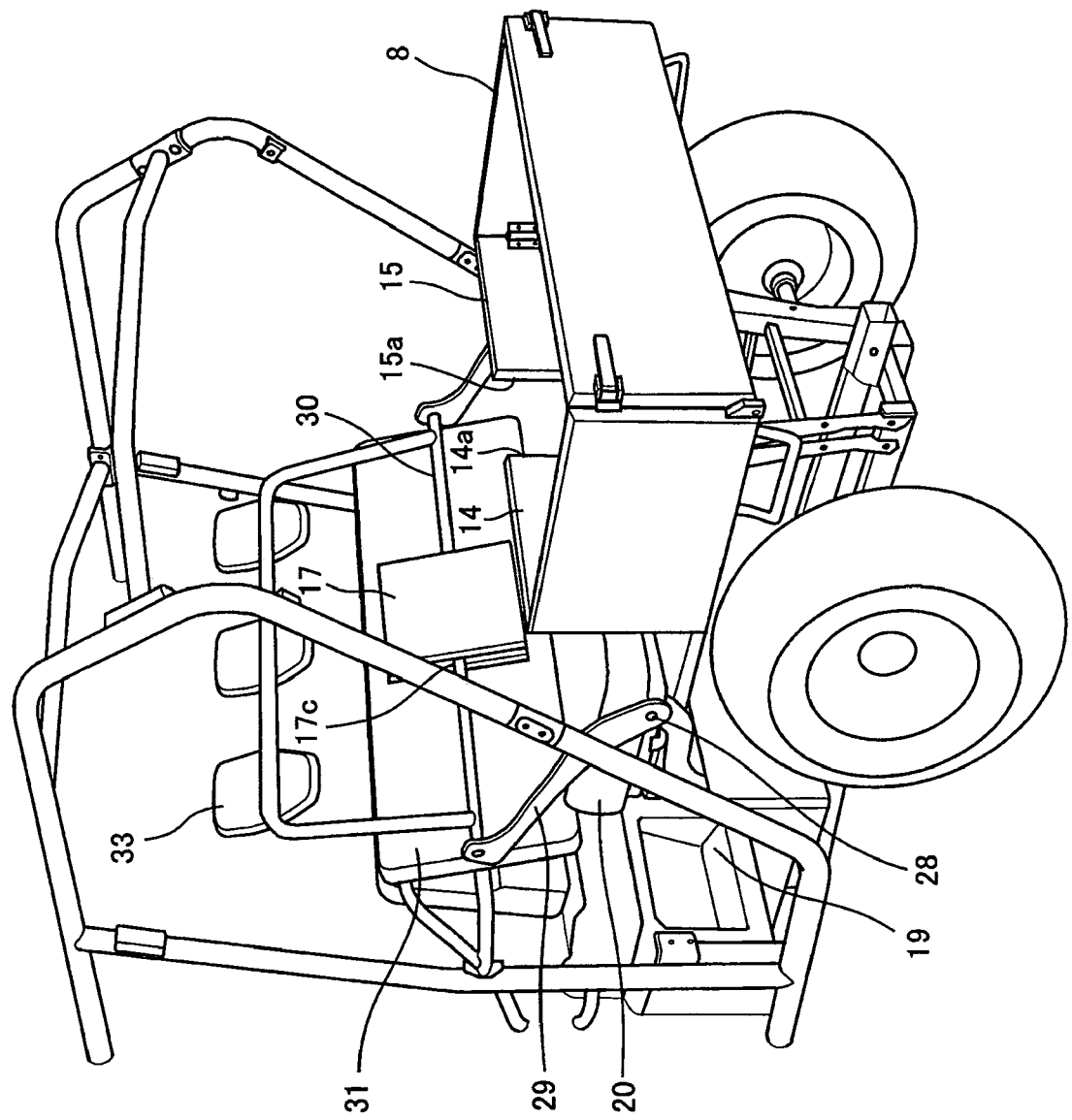
FIG. 5 is a perspective view showing a state where the closing wall member is attached to the rear seat backrest in the utility vehicle of FIG. 4, as viewed from rear.

Subsequently, a procedure for extending the utility vehicle 1 will be described with reference to FIGS. 4 to 10. FIGS. 4 to 10 show the procedure for extending the cargo bed 8 of the utility vehicle 1. First, as shown in FIG. 4, the rear seat backrest 31 starts to be rotated forward around the pivots 28 of the pivot arms 29. In addition, the closing wall member 17 is caused to slide upward and removed from the gate-shaped wall members 14 and 15. Then, as shown in FIG. 5, the fitting groove 17c of the closing wall member 17 is fitted to the backrest support pipe 30 of the rear seat backrest 31 so that the closing wall member 17 engages with the backrest support pipe 30 which is a fixing member for fixing the closing wall member 17. That is, the closing wall member 17 is removably attached to a part of the utility vehicle 1. This enables the utility vehicle 1 loaded with the closing wall member 17 to travel to a desired spot in the extended state of the cargo bed 8, and to thereafter return the cargo bed 8 to its unextended state at the desired spot.

Then, as shown in FIG. 6, the pivot arms 29 are pivoted forward so that the rear seat backrest 31 is moved over the rear seat seating portion 20 and is stowed into a leg space 19 formed between the front seat 6 and the rear seat 7. To be more specific, the rear seat backrest 31 is stowed into the leg space 19 to be sandwiched between a backrest of the front seat 6 and the rear seat seating portion 20. In this state, a lower end of the rear seat backrest 31 is positioned lower than the bottom wall member 10 of the cargo bed 8. Then, the rear seat backrest 31 or a member integral with the rear seat backrest 31 is fastened to a fixed member such as the front seat 6 by a fastener member (not shown) such as a belt. Alternatively, a known ratchet mechanism may be provided at a portion of the pivot 28 for positioning of the rear seat backrest 31.

Figure 8:
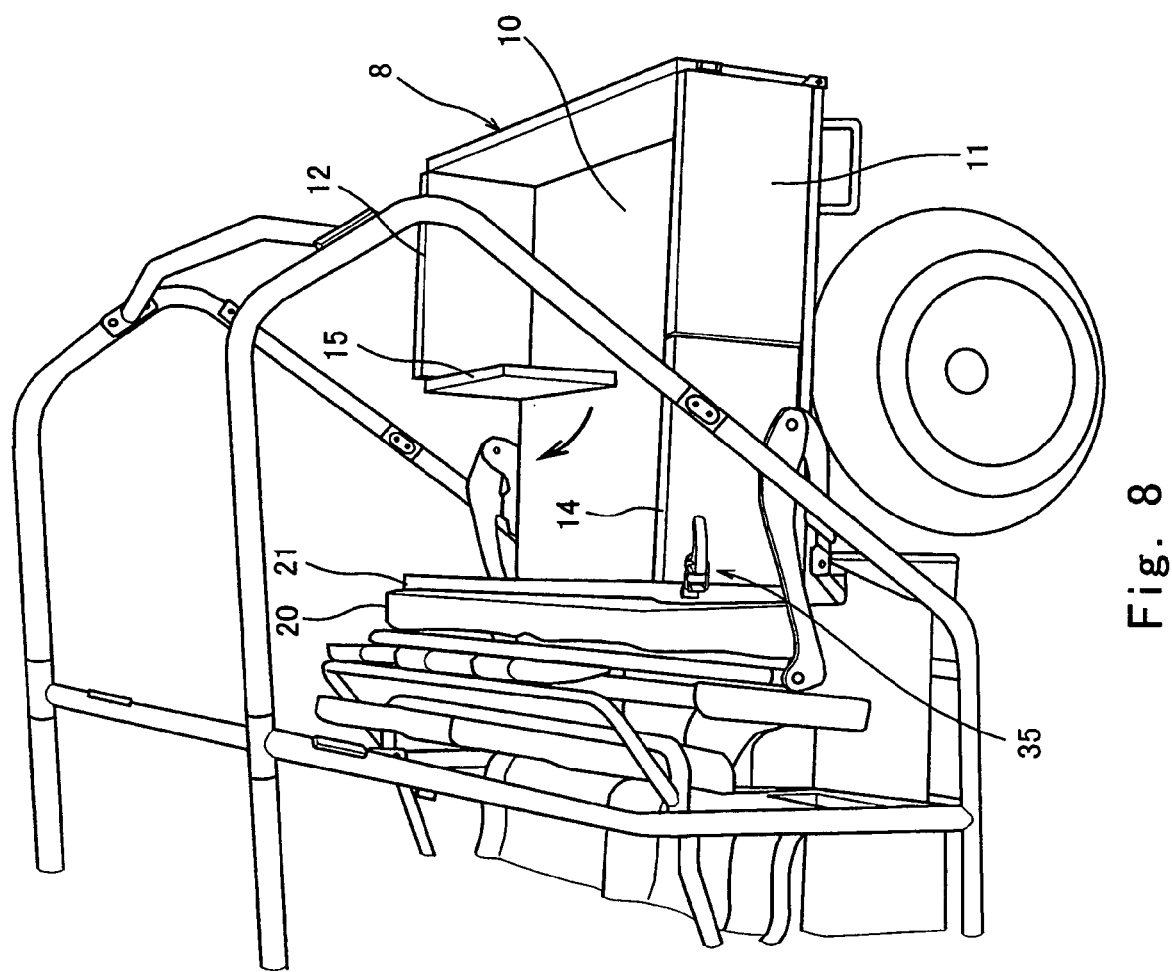
FIG. 8 is a perspective view showing a state where a left gate-shaped wall member of a pair of right and left gate-shaped wall members is rotated forward in the utility vehicle of FIG. 7, as viewed from left and above.

Then, as shown in FIG. 7, the rear seat seating portion 20 and the bottom plate 21 are rotated forward 90 degrees around the hinges 22 (see FIG. 3) to the upright position. Then, as shown in FIG. 8, the left gate-shaped wall member 14 is rotated forward around the hinge 16 (see FIG. 2) to be substantially coplanar with the left side wall member 11. Then, as shown in FIG. 9, the left gate-shaped wall member 14 is fastened to the bottom plate 21 by the buckle type fastening mechanism 35.

Figure 9:
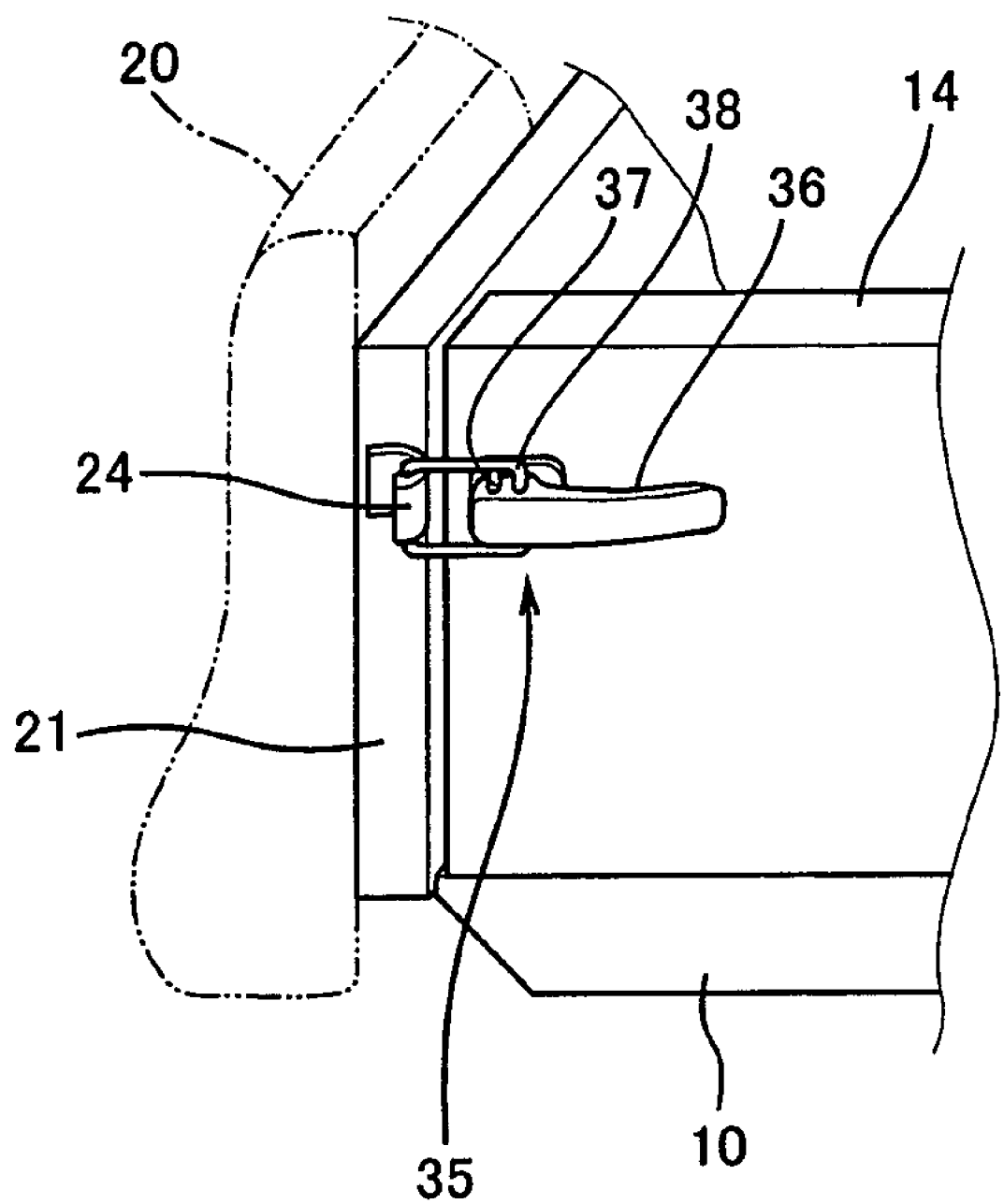
FIG. 9 is a perspective view showing a fastening mechanism for fastening a bottom plate of the rear seat seating portion to the left gate-shaped wall member in the utility vehicle of FIG. 8.

As shown in FIG. 9, the fastening mechanism 35 includes a pivot shaft 37 fixed to the gate-shaped wall member 14, a lever 36 rotatably attached at one end portion thereof to the pivot shaft 37, a rectangular-ring shaped engagement member 38 rotatably attached to the lever 36 in a location closer to an opposite end of the lever 36 than the pivot shaft 37, and the hook-shaped engaged member 24 attached to the side end surface of the bottom plate 21. The lever 36 is rotated around the pivot shaft 37 to cause the engagement member 38 to engage with the engaged member 24, thereby enabling the gate-shaped wall member 14 attached with the engagement member 38 to be coupled to the bottom plate 21 attached with the engaged member 24.

Figure 10:
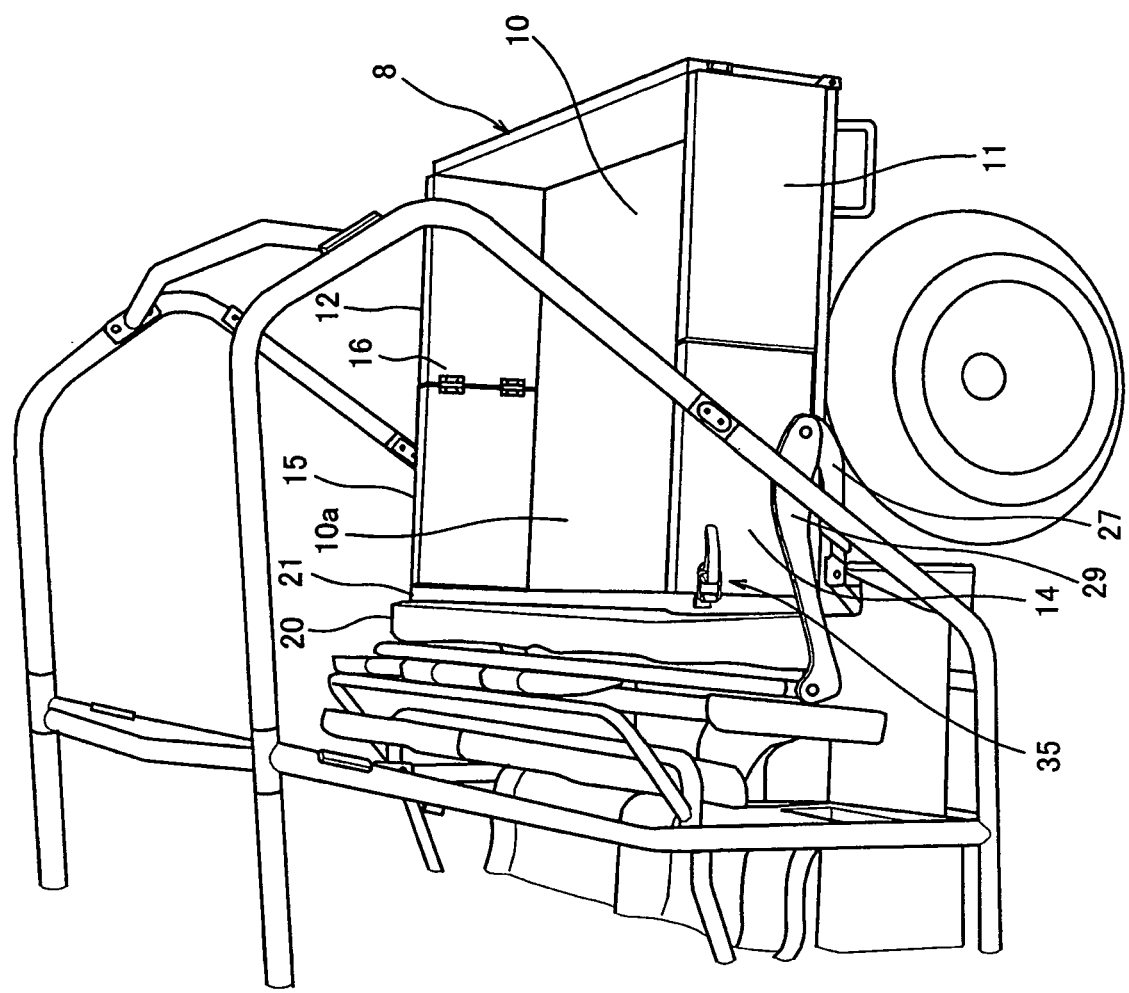
FIG. 10 is a perspective view showing a state where the right gate-shaped wall member is rotated forward in the utility vehicle of FIG. 8, as viewed from left and above.

Then, as shown in FIG. 10, the right gate-shaped wall member 15 is rotated forward around the hinge 16 (see FIG. 2) to be substantially coplanar with the right side wall member 12 and is fastened to the bottom plate 21 by the buckle type fastening mechanism 35 (see FIG. 9), as in the left gate-shaped wall member 14. As a result, in the state where the rear seat seating portion 20 is rotated forward and in the upright position, the bottom plate 21 defines the front wall member of the cargo bed 8, and the cargo accommodating space of the cargo bed 8 is extended forward by the length of the gate-shaped wall members 14 and 15. This is the extended state of the cargo bed 8 in which the rear seat 7 is not in use. In this state, the pivot arms 29 and the brackets 27 are positioned higher than the bottom wall member 10 of the cargo bed 8, and outside of right and left sides of the bottom wall member 10. This makes it possible to avoid that the gate-shaped wall members 14 and 15 are bent outward due to an external force applied thereto. Therefore, reinforcement members for improving stiffness of the gate-shaped wall members 14 and 15 can be reduced or otherwise omitted.

Figure 11:
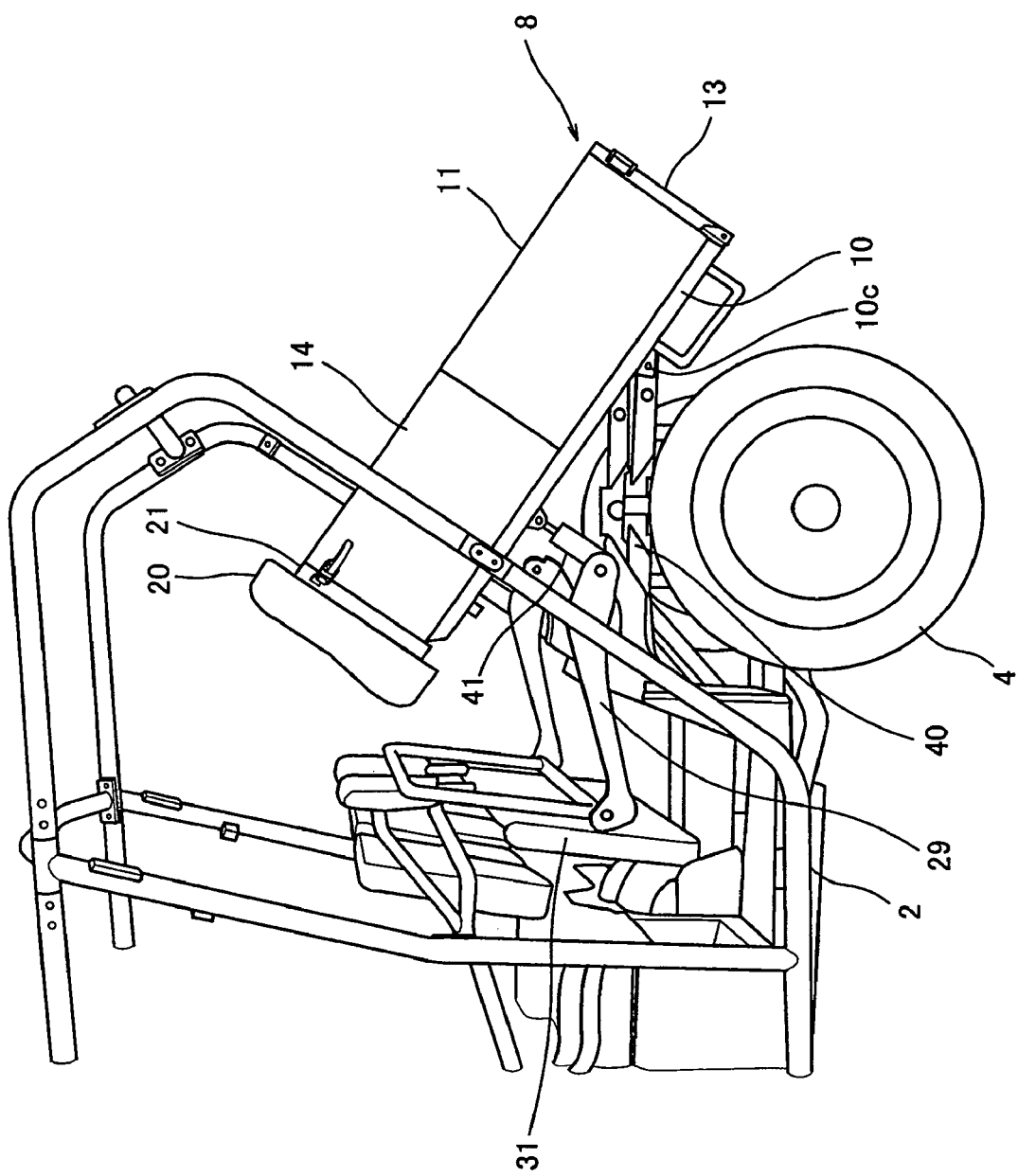
FIG. 11 is a perspective view showing a state where the cargo bed is tilted in the utility vehicle of FIG. 10.

As shown in FIG. 11, a bracket 10c is attached to a rear portion of a lower surface of the bottom wall member 10 of the cargo bed 8. The bracket 10c is coupled to a frame member 40 extending in the longitudinal direction between the right and left rear wheels 4 such that the bracket 10c is rotatable around an axis extending in the lateral direction. A hydraulic actuator 41 is mounted between the bottom wall member 10 and the frame member 40 and is configured to vertically move a portion of the bottom wall member 10 which is located forward relative to the bracket 10c. The actuator 41 is operated to cause the cargo bed 8 to be rotated and tilted around the bracket 10c together with the rear seat seating portion 20. In this case, since the pivot arms 29 are not fastened to the cargo bed 8, i.e., are not integral with the cargo bed 8, the rear seat backrest 31 is not rotated to be tilted together with the cargo bed 8 even though the actuator 41 drives the cargo bed 8.

As should be understood from the above, by rotating the rear seat seating portion 20 forward to the upright position, the bottom plate 21 of the rear seat seating portion 20 is directed backward and defines the front wall member of the cargo bed 8. This makes it possible to omit the operation for removing and attaching the front wall member of the cargo bed 8. As a result, a user is able to easily accomplish extension of the cargo bed 8.

Furthermore, since the bottom plate 21 in the upright position resulting from the forward rotation of the rear seat seating portion 20 is easily coupled to the front end portions of the gate-shaped wall members 14 and 15 by the fastening members 35, the user is able to accomplish extension of the cargo bed 8 more easily.

During the use of the rear seat seating portion 20 when the cargo bed 8 is unextended, the gate-shaped wall members 14 and 15 are rotated in the direction closer to each other so that the gate-shaped wall members 14 and 15 define the front wall member of the cargo bed 8, and the closing wall member 17 removably attachable closes the gap formed between the tip end portions 14a and 15b of the wall members 14 and 15 which are end portions located closer to each other. Since the tip end portions 14a and 15a of the gate-shaped wall members 14 and 15 need not be in contact with each other in the state where the gate-shaped wall members 14 and 15 are rotated in the direction closer to each other, the length of the gate-shaped wall members 14 and 15 can be designed flexibly.

Furthermore, since the vibration-proof rubber members 23 are provided between the bottom plate 21 of the rear seat seating portion 20 and the bottom wall member 10 of the cargo bed 8 to be able to absorb vibration during travel when the rear seat seating portion 20 is in use, no vibration is transmitted from the bottom wall member 10 of the cargo bed 8 to the bottom plate 21 of the rear seat seating portion 20.

Since the rear seat backrest 31 is positioned with the gap to be spaced apart from the rear seat seating portion 20, it is easily movable forward over the rear seat seating portion 20 to the forward location relative to the rear seat seating portion 20 according to the pivot operation of the pivot arms 29 without interference with the rear seat seating portion 20. As a result, the user is able to accomplish extension of the cargo bed 8 more easily.

Figure 12:
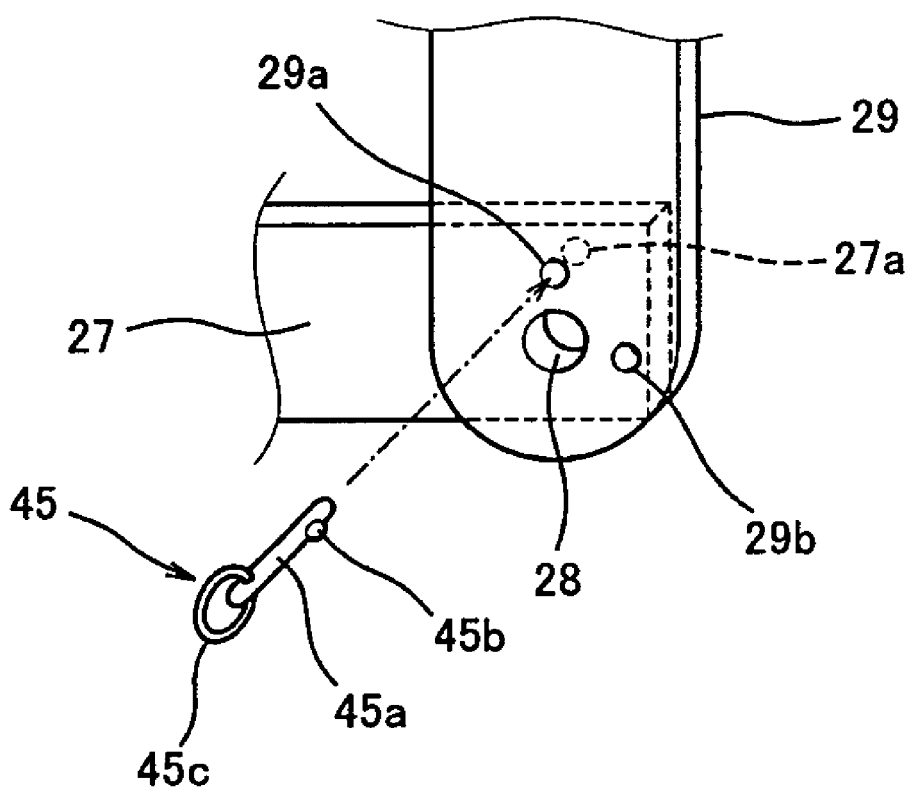
FIG. 12 is a perspective view showing main parts of a utility vehicle according to a second embodiment.

FIG. 12 is a perspective view showing main parts of a utility vehicle according to a second embodiment. As shown in FIG. 12, in the second embodiment, a stopper mechanism is equipped to permit and inhibit the angular displacement between the pivot arm 29 and the bracket 27. To be more specific, a stopper hole 27a is formed on the bracket 27 in a location near the pivot 28, and two stopper holes 29a and 29b are formed on the pivot arm 29 in locations near the pivot 28. The stopper holes 27a, 29a, and 29b are an equal distance apart from the pivot 28. In the state shown in FIG. 2, the stopper hole 27a and the stopper hole 29a are in alignment, while in the state shown in FIG. 10, the stopper hole 27a and the stopper hole 29b are in alignment. A stopper pin 45 is inserted into and is engaged with the stopper holes 27a and 29a, which are in alignment, or the stopper holes 27a and 29b, which are in alignment.

The stopper pin 45 includes a shaft portion 45a having an outer diameter which is slightly smaller than inner diameters of the stopper holes 27a, 29a, and 29b, a stopper ball 45b protrusibly provided on an outer peripheral surface of a tip end portion of the shaft portion 45a, and a grip ring 45c provided at the shaft portion 45a. By inserting the stopper pin 45 into the stopper holes 27a and 29a or the stopper holes 27a and 29b, which are in alignment in such a manner that a portion of the pin 45 which is provided with the stopper ball 45b is directed forward, angular displacement between the pivot arm 29 and the bracket 27 is inhibited. The stopper ball 45b is applied with a force to be in a protruded state to inhibit the shaft portion 45a from coming off from the stopper holes 27a and 29a or 29b. On the other hand, by pulling out the stopper pin 45 from the stopper holes 27a and 29a or 29b, the angular displacement between the pivot arm 29 and the bracket 27 is permitted. The stopper mechanism for stopping the pivot arm 29 and the bracket 27 is not limited to the above but any other suitable mechanism may be used so long as the pivot arm 29 and the bracket 27 are positioned and retained in the state shown in FIG. 2 and in the state shown in FIG. 10.

Figure 13:
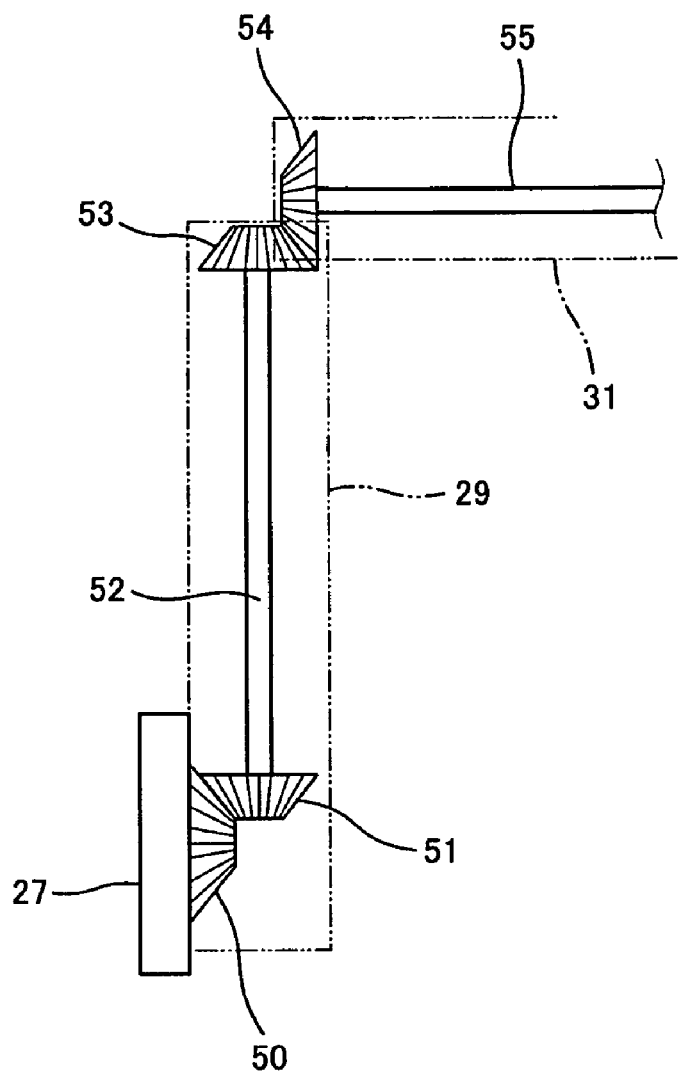
FIG. 13 is a rear view schematically showing main parts of a utility vehicle according to a third embodiment.

FIG. 13 is a rear view schematically showing main parts of a utility vehicle according to a third embodiment. As shown in FIG. 13, in the third embodiment, the pivot arm 29 is angularly displaceable with respect to the rear seat backrest 31 in association with the angular displacement of the pivot arm 29 with respect to the bracket 27 which is a part of a vehicle body frame. To be more specific, a first bevel gear 50 is fixedly mounted on the bracket 27. A first shaft 52 is rotatably attached to the pivot arm 29 so as to extend in a longitudinal direction thereof. A second bevel gear 51 and a third bevel gear 53 are fixedly mounted on both end portions of the first shaft 52. A second shaft 55 is fixedly coupled to the rear seat backrest 31 so as to extend in the lateral direction. A fourth bevel gear 54 is mounted on an end portion of the second shaft 55. The first bevel gear 50 is in mesh with the second bevel gear 51, and the third bevel gear 53 is in mesh with the fourth bevel gear 54. In this structure, in association with the pivot operation of the pivot arm 29, an angle formed between the pivot arm 29 and the rear seat backrest 31 is automatically changed.

Figure 14:
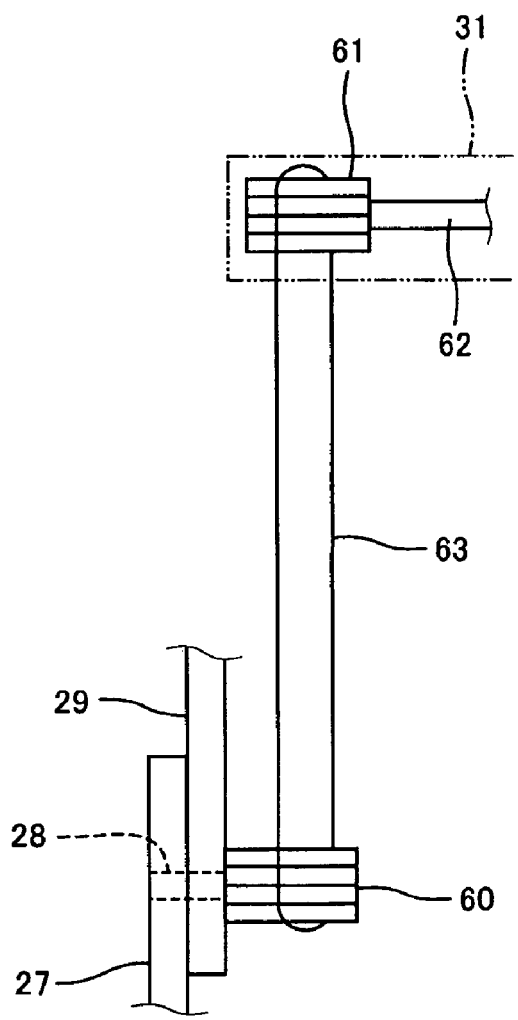
FIG. 14 is a rear view schematically showing main parts of a utility vehicle according to a fourth embodiment.

FIG. 14 is a rear view schematically showing main parts of a utility vehicle according to a fourth embodiment. In this embodiment, a first sprocket 60 is fixedly mounted on the pivot arm 29 so as to be located on an axis of the pivot 28. A shaft 62 is fixedly coupled to the rear seat backrest 31 so as to extend in the lateral direction. A second sprocket 61 is mounted on an end portion of the shaft 62. A chain 63 is installed around the first sprocket 60 and the second sprocket 61. In association with the pivot operation of the pivot arm 29, an angle formed between the pivot arm 29 and the rear seat backrest 31 is automatically changed. The chain 63 may be replaced by other suitable members such as a belt.

Whereas in the first to third embodiments, the bottom plate 21 is formed of the metal plate, it may be formed of a resin plate so long as it has stiffness. In addition, instead of the gate-shaped wall members 14 and 15, which are respectively protrusible forward from the front end portions of the side wall members 11 and 12, the side wall members 11 and 12 may be configured to have a sliding mechanism which is extendable forward. Alternatively, a closing wall member may be rotatably attached by a hinge to an end portion of the gate-shaped wall member 14 which is located closer to the gate-shaped wall member 15. In this case, in the unextended state, the closing wall member may be rotated to be substantially coplanar with the gate-shaped wall member 14 and be coupled to an end portion of the gate-shaped wall member 15 which is located closer to the gate-shaped wall member 14.

Instead of the closing wall member 17 separable from the gate-shaped wall members 14 and 15, the gap formed between the tip end portions 14a and 15a of the gate-shaped wall members 14 and 15 may be closed by other suitable members for closing the gap, for example, a sliding wall member provided at the gate-shaped wall member 14 protrusibly toward the gate-shaped wall member 15. The gate-shaped wall members 14 and 15 may be fastened to the bottom plate 21 by other suitable fastening mechanism capable of unfastening the wall members 14 and 15, instead of the buckle type fastening mechanisms 35. Whereas the bottom plate 21 in the upright position resulting from the forward rotation of the rear seat seating portion 20 is substantially equal in height to the side wall members 11 and 12, and the gate-shaped wall members 14 and 15, it may be alternatively larger in height than the side wall members 11 and 12 and the gate-shaped wall members 14 and 15.

The coupling structure for coupling the gate-shaped wall members 14 and 15 to the closing wall member 17 in the unextended state may be other suitable structure, instead of the above described coupling structure. For example, concave portions may be formed on end portions of the gate-shaped wall members 14 and 15, which are located closer to each other, and convex portions may be formed on corresponding end portions of the closing wall member 17 such that the convex portions are respectively fitted to the concave portions. By using such a convex-concave structure, the closing wall member 17 can be removably coupled to the gate-shaped wall members 14 and 15 more easily than using the bolts and others. Furthermore, in the unextended state, the closing wall member 17 may be coupled to gate-shaped wall members 14 and 15 by bolt-coupling, magnet-coupling, or sandwiching and retaining them by a fastening mechanism having two retaining members.

A sensor may be attached to detect an angular position of the pivot arm 29 or an angular position of the rear seat 7. Based on a detection signal from the sensor, it may be determined that the cargo bed 8 is in the unextended state or in the extended state. For example, if a controller for the actuator 41 determines that the cargo bed 8 is in the unextended state based on the detection signal received from the sensor, it may stop the operation of the actuator 41. This makes it possible to avoid that the cargo bed 8 is tilted together with the rear seat 7 and the rear seat 7 interferes with the frame member and others. Furthermore, the rear seat backrest 31 may be omitted. Moreover, the actuator 41 may be omitted and the cargo bed 8 may be configured not to be tilted.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
    plural rows of seats mounted in a vehicle body of the utility vehicle; and
    an extendable cargo bed positioned behind the plural rows of seats;
    wherein the cargo bed includes a bottom wall member having a forward region which extends forward relative to a cargo accommodating space in an unextended state of the cargo bed;
    wherein the plural rows of seats include a rear seat having a rear seat seating portion which is rotatably provided on the forward region of the bottom wall member such that the rear seat seating portion is rotatable forward to an upright position;
    wherein the rear seat seating portion has a bottom plate provided integrally with a bottom surface thereof;
    wherein in a state where the rear seat seating portion is rotated forward and is in the upright position, the bottom plate of the rear seat seating portion defines a front wall member of the cargo bed;
    a rear seat backrest positioned above a rear end portion of the rear seat seating portion;
    wherein the rear seat backrest is rotatably coupled to a vehicle body frame by a pivot arm such that the rear seat backrest is able to move forward over the rear seat seating portion to a location forward relative to the rear seat seating portion; and
    wherein the pivot arm is angularly displaceable with respect to the vehicle body frame and is angularly displaceable with respect to the rear seat backrest.

2. The utility vehicle according to claim 1, further comprising:
    a stopper mechanism configured to permit and inhibit the angular displacement of the pivot arm.

3. A utility vehicle comprising:
    plural rows of seats mounted in a vehicle body of the utility vehicle; and
    an extendable cargo bed positioned behind the plural rows of seats;
    wherein the cargo bed includes a bottom wall member having a forward region which extends forward relative to a cargo accommodating space in an unextended state of the cargo bed;
    wherein the plural rows of seats include a rear seat having a rear seat seating portion which is rotatably provided on the forward region of the bottom wall member such that the rear seat seating portion is rotatable forward to an upright position;
    wherein the rear seat seating portion has a bottom plate provided integrally with a bottom surface thereof;
    wherein in a state where the rear seat seating portion is rotated forward and is in the upright position, the bottom plate of the rear seat seating portion defines a front wall member of the cargo bed;
    a rear seat backrest positioned above a rear end portion of the rear seat seating portion;
    wherein the rear seat backrest is rotatably coupled to a vehicle body frame by a pivot arm such that the rear seat backrest is able to move forward over the rear seat seating portion to a location forward relative to the rear seat seating portion; and
    wherein the pivot arm is angularly displaceable with respect to the rear seat backrest in association with angular displacement of the pivot arm with respect to the vehicle body frame.

4. A utility vehicle comprising:
    plural rows of seats mounted in a vehicle body of the utility vehicle; and
    an extendable cargo bed positioned behind the plural rows of seats;
    wherein the cargo bed includes a bottom wall member having a forward region which extends forward relative to a cargo accommodating space in an unextended state of the cargo bed;
    wherein the plural rows of seats include a rear seat having a rear seat seating portion which is rotatably provided on the forward region of the bottom wall member such that the rear seat seating portion is rotatable forward to an upright position;
    wherein the rear seat seating portion has a bottom plate provided integrally with a bottom surface thereof;
    wherein in a state where the rear seat seating portion is rotated forward and is in the upright position, the bottom plate of the rear seat seating portion defines a front wall member of the cargo bed;
    a rear seat backrest positioned above a rear end portion of the rear seat seating portion;
    wherein the rear seat backrest is rotatably coupled to a vehicle body frame by a pivot arm such that the rear seat backrest is able to move forward over the rear seat seating portion to a location forward relative to the rear seat seating portion; and
    wherein in a stowed state in which the rear seat backrest is moved over the rear seat seating portion and is in a location forward relative to the rear seat seating portion, a lower end of the rear seat backrest is lower than the bottom wall member of the cargo bed.

* * * * *